US012694525B2

(12) United States Patent
Yuen et al.

(10) Patent No.: US 12,694,525 B2
(45) Date of Patent: Jul. 28, 2026

(54) GENERATIVE ADVERSARIAL NETWORK-BASED LOSSLESS IMAGE COMPRESSION MODEL FOR CROSS-SECTIONAL IMAGING

(71) Applicants: Versitech Limited, Hong Kong (CN); The Education University of Hong Kong, Hong Kong (CN)

(72) Inventors: Man Fung Yuen, Hong Kong (CN); Gilbert Chiu Sing Lui, Hong Kong (CN); Jianliang Lu, Hong Kong (CN); Keith Wan Hang Chiu, Hong Kong (CN); Wai Kay Walter Seto, Hong Kong (CN); Philip Leung Ho Yu, Hong Kong (CN)

(73) Assignees: Versitech Limited, Hong Kong (CN); The Education University of Hong Kong, Hong Kong (CN)

( * ) Notice: Subject to any disclaimer, the term of this patent is extended or adjusted under 35 U.S.C. 154(b) by 224 days.

(21) Appl. No.: 18/580,989

(22) PCT Filed: Jul. 18, 2022

(86) PCT No.: PCT/CN2022/106185
§ 371 (c)(1),
(2) Date: Jan. 19, 2024

(87) PCT Pub. No.: WO2023/001089
PCT Pub. Date: Jan. 26, 2023

(65) Prior Publication Data
US 2024/0331144 A1     Oct. 3, 2024

Related U.S. Application Data

(60) Provisional application No. 63/223,766, filed on Jul. 20, 2021.

(51) Int. Cl.
*G06T 7/00*     (2017.01)
*G06T 12/20*     (2026.01)

(52) U.S. Cl.
CPC ............ *G06T 7/0012* (2013.01); *G06T 12/20* (2026.01); *G06T 2207/10081* (2013.01);
(Continued)

(58) Field of Classification Search
CPC ................. G06T 7/0012; G06T 11/006; G06T 2207/10081; G06T 2207/20081;
(Continued)

(56) References Cited

PUBLICATIONS

Kieselmann, "Cross-modality deep learning: Contouring of MRI data from annotated CT data only", 2019, Medical Physics, vol. 48, Issue 4, pp. 1673-1684 (Year: 2019).*
(Continued)

*Primary Examiner* — Oneal R Mistry
*Assistant Examiner* — Justin Philip Cascais
(74) *Attorney, Agent, or Firm* — Leason Ellis LLP

(57) ABSTRACT
A novel medical image generation approach synthesizes thin-cut computerized tomography (CT) images from thick-cut CT ones as inputs. First thick-cut CT images are obtained by maximizing the pixel-wise intensity of five or more than five continuous thin-cut ones after image registration. Second, the obtained thick-cut CT images are fed into a generator block which adopts an encoder-decoder architecture, where each thick-cut image is encoded into low-dimensional embedding space before decoding into multiple thin-cut ones. Third, a discriminator focuses on distinguishing original real thin-cut images from synthetic thin-cut images. An adversarial mechanism between the generator and discriminator causes the discriminator's output to provide an effective gradient update of the network parameters for the generator to increasingly improve the generator's ability to
(Continued)

(a)

(b)

synthesize higher-quality thin-cut images and in turn promotes the discriminator's discriminating capability.

6 Claims, 4 Drawing Sheets

(52) U.S. Cl.
CPC ............... *G06T 2207/20081* (2013.01); *G06T 2207/30056* (2013.01); *G06T 2207/30096* (2013.01); *G06T 2207/30168* (2013.01)

(58) Field of Classification Search
CPC . G06T 2207/30056; G06T 2207/30096; G06T 2207/30168; G06T 3/4053
See application file for complete search history.

(56) References Cited

PUBLICATIONS

Zhang, "SOUP-GAN: Super-Resolution MRI Using Generative Adversarial Networks", Jun. 4, 2021, EMB (Year: 2021).*
Pambrun, "Compressibility variations of JPEG2000 compressed computed tomography", 2013, IEEE EMBS, pp. 3375-3378 (Year: 2013).*
Arjovsky, et al., "Wasserstein generative adversarial networks," International Conference on Machine Learning, PMLR 70, 2017 pp. 214-223.
Bae, et al., "Residual CNN-based Image Super-Resolution for CT Slice Thickness Reduction using Paired CT Scans: Preliminary Clinical Validation," 1st Conference on Medical Imaging with Deep Learning (MIDL 2018), 3 pages.
Bayramoglu, et al., "Towards Virtual H&E Staining of Hyperspectral Lung Histology Images Using Conditional Generative Adversarial Networks," IEEE International Conference on Computer Vision Workshops (ICCVW), pp. 64-71.
Ben-Cohen, et al., "Cross-modality synthesis from CT to PET using FCN and GAN networks for improved automated lesion detection," Engineering Applications of Artificial Intelligence 78 (2019) pp. 186-194.
Chen, et al., "Unsupervised Detection of Lesions in Brain MRI using constrained adversarial auto-encoders," 1st Medical Imaging for Deep Learning (MIDL 2018), 9 pages.
Chen, et al., "Efficient and Accurate MRI Super-Resolution using a Generative Adversarial Network and 3D Multi-Level Densely Connected Network," International Conference on Medical Image Computing and Computer-Assisted Intervention, 2018, pp. 91-99.
Chollet, "Xception: Deep Learning with Depthwise Separable Convolutions," IEEE Conference on Computer Vision and Pattern Recognition (CVPR), 2017, pp. 1800-1807.
Dong, et al., "Learning a deep convolutional network for image super-resolution, European conference on computer vision," Springer, 2014, pp. 184-199.
Frid-Adar, et al., "GAN-based synthetic medical image augmentation for increased cnn performance in liver lesion classification," Neurocomputing, 2018, 321, pp. 321-331.
Goodfellow, et al., Generative Adversarial Nets, Departement d'informatique et de recherche operationnelle, 2014, pp. 2672-2680.
Guibas, et al., "Synthetic Medical Images from Dual Generative Adversarial Networks," arXiv preprint arXiv:, Jan. 2, 2018, 1709. 01872, 9 pages.
He, et al., "Deep residual learning for image recognition," Proceedings of the IEEE conference on computer vision and pattern recognition, 2016, pp. 770-778.
Huang, et al., "Densely Connected Convolutional Networks," IEEE Conference on Computer Vision and Pattern Recognition (CVPR), 2017, pp. 2261-2269.
Isola, et al., "Image-to-image Translation with Conditional Adversarial Networks," Proceedings of the IEEE Conference on Computer Vision and Pattern Recognition, 2017, pp. 1125-1134.

Jin, et al., "CT-Realistic Lung Nodule Simulation from 3d Conditional Generative Adversarial Networks for Robust Lung Segmentation," International Conference on Medical Image Computing and Computer-Assisted Intervention, Springer, 2018, pp. 732-740.
Karras, et al., "Progressive Growing of Gans for Improved Quality, Stability, and Variation," International Conference on Learning Representations, 2018, 26 pages.
Kudo, et al., "Virtual Thin Slice: 3D Conditional Gan-Based Super-Resolution for CT Slice Interval," Springer, 2019, pp. 91-100.
Ledig, et al., Photo-Realistic Single Image Super-Resolution Using a Generative Adversarial Network, Proceedings of the IEEE conference on computer vision and pattern recognition, 2017, pp. 4681-4690.
Li, et al, "H-denseunet: Hybrid Densely Connected Unet for Liver and Tumor Segmentation from CT Volumes," IEEE Transactions on Medical Imaging 37, 2018, 2663-2674.
Liu, et al, "Multi-Stream Progressive Up-Sampling Network for Dense CT Image Reconstruction," Medical Image Computing and Computer Assisted Intervention—MICCAI, Springer International Publishing, 2020, pp. 518-528.
Madani, et al, Semisupervised Learning with Generative Adversarial Networks for Chest X-ray Classification with Ability of Data Domain Adaptation, IEEE 15th International Symposium on Biomedical Imaging, 2018, pp. 1038-1042.
Maspero, et al, "Dose Evaluation of Fast Synthetic-CT Generation using a Generative Adversarial Network for General Pelvis MR-Only Radiotherapy," Physics in Medicine & Biology, 63, 185001, 2018, 12 pages.
Mok, et al., "Learning Data Augmentation for Brain Tumor Segmentation with Coarse-to-Fine Generative Adversarial Networks, Brainlesion: Glioma, Multiple Sclerosis, Stroke and Traumatic Brain Injuries," Springer International Publishing, 2019, pp. 70-80.
Pan, et al, "Synthesizing Missing PET from MRI with Cycle-consistent Generative Adversarial Networks for Alzheimer's Disease Diagnosis," Medical Image Computing and Computer Assisted Intervention—MICCAI, 2018, pp. 455-463.
Qin, et al, "A GAN-based image synthesis method for skin lesion classification," Computer Methods and Programs in Biomedicine 195, 105568, 2020, 19 pages.
Radford, et al., "Unsupervised Representation Learning With Deep Convolutional Generative Adversarial Networks," Under review as a confernce paper at ICLR 2016, arXiv preprint arXiv:1511. 06434v2, 16 pages.
Ren, et al. "Adversarial Domain Adaptation for Classication of Prostate Histopathology Whole-Slide Images," International Conference on Medical Image Computing and Computer-Assisted Intervention, Springer, 2018, pp. 201-209.
Schlegl, et al., "Unsupervised Anomaly Detection with Generative Adversarial Networks to Guide Marker Discovery," International conference on information processing in medical imaging, Springer, 2017, pp. 146-157.
Simonyan, et al., "Very Deep Convolutional Networks for Large-Scale Image Recognition," 3rd International Conference on Learning Representations, ICLR 2015, 14 pages.
Wang, et al., "3D conditional generative adversarial networks for high-quality PET image estimation at low dose," Neuroimage 174, 2018, pp. 550-562.
Wolterink, et al., "Generative adversarial networks for noise reduction in low-dose CT," IEEE Transactions on Medical Imaging 36, 2017, pp. 2536-2545.
Xue, et al., "SegAN: Adversarial Network with Multi-scale L1 Loss for Medical Image Segmentation," Neuroinformatics 16, 2018, pp. 383-392.
Yang, et al., "Automatic Liver Segmentation Using an Adversarial Image-to-Image Network," International Conference on Medical Image Computing and Computer-Assisted Intervention, Springer, 2017, pp. 507-515.
Yang, et al., "Unsupervised MR-to-CT Synthesis Using Structure-Constrained CycleGAN," IEEE Transactions on Medical Imaging 39, 2020, pp. 4249-4261.
Yi, et al., "Generative Adversarial Network in Medical Imaging: A Review," Medical Image Analysis 58, 101552, 2019, 20 pages.

(56)                    References Cited

PUBLICATIONS

Ying, et al., "X2CT-GAN: Reconstructing CT from Biplanar X-Rays with Generative Adversarial Networks," Proceedings of the IEEE/CVF Conference on Computer Vision and Pattern Recognition, 2019, pp. 10619-10628.

Zhang, et al., "Deep Adversarial Networks for Biomedical Image Segmentation Utilizing Unannotated Images," International Conference on Medical Image Computing and Computer-Assisted Intervention, Springer, 2017, pp. 408-416.

Zhang, et al., "Translating and Segmenting Multimodal Medical vols. with Cycle- and Shape-Consistency Generative Adversarial Network," Proceedings of the IEEE conference on computer vision and pattern Recognition, 2018, pp. 9242-9251.

Zhu, et al, "Unpaired Image-to-Image Translation using Cycle-Consistent Adversarial Networks," IEEE International Conference on Computer Vision (ICCV), 2017, pp. 2223-2232.

Park, et al., "Computed tomography super-resolution using deep convolutional neural network," Physics in Mediciene & Biology, 63, 2018, 13 pages.

Z. Xie, et al., "Generative adversarial network-based regularized image reconstruction for PET," Physics in Medicine & Biology, 65, 2020, 14 pages.

Han, et al, MR-based synthetic CT generation using a deep convolutional neural network method, Med. Phys. 44 (4), Apr. 2017, pp. 1408-1419.

Nie, et al., "Medical Image Synthesis with Context-Aware Generative Adversarial Networks," Springer International Publishing AG 2017, pp. 417-425.

You, et al., CT Super-resolution GAN Constrained by the Identical, Residual, and Cycle Learning Ensemble (Gan-Circle), IEEE Transtions on Medical Imaging, vol. 39, No. 1, Jan. 2020, pp. 188-203.

International Search Report and Written Opinion of corresponding International Application No. PCT/CN2022/106185 mailed Oct. 20, 2022. 6 pages.

* cited by examiner

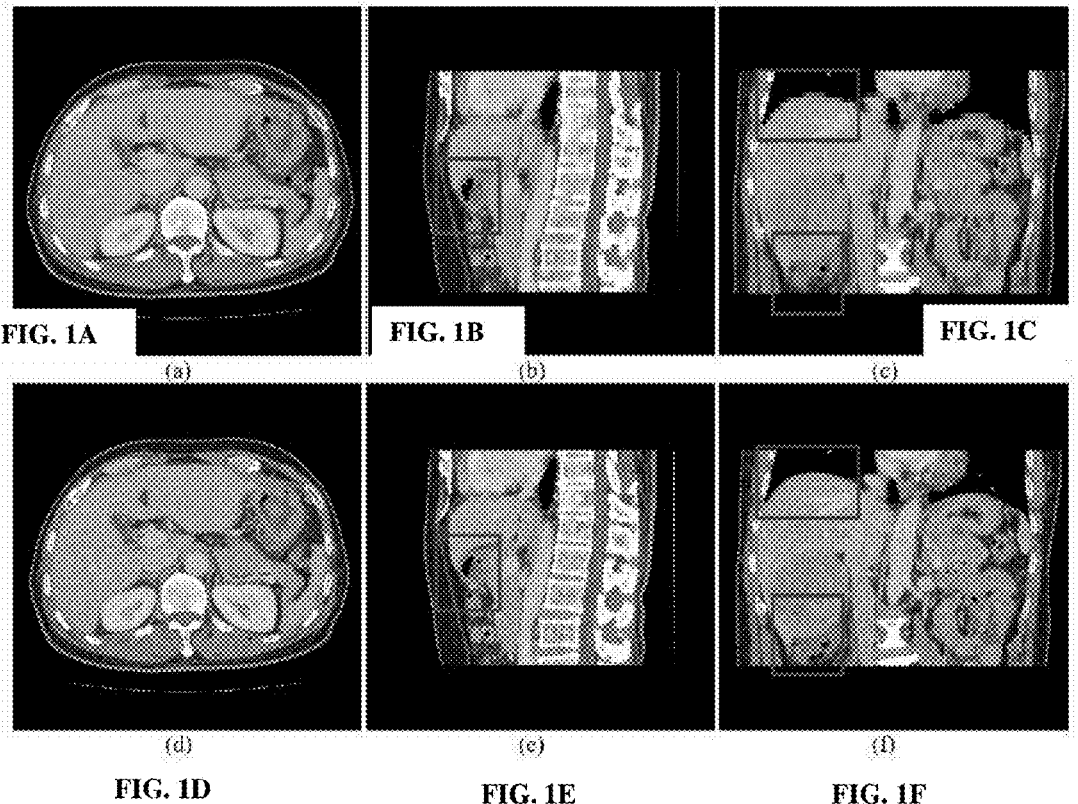
FIG. 1A
(a)
FIG. 1B
(b)
FIG. 1C
(c)
FIG. 1D
(d)
FIG. 1E
(e)
FIG. 1F
(f)
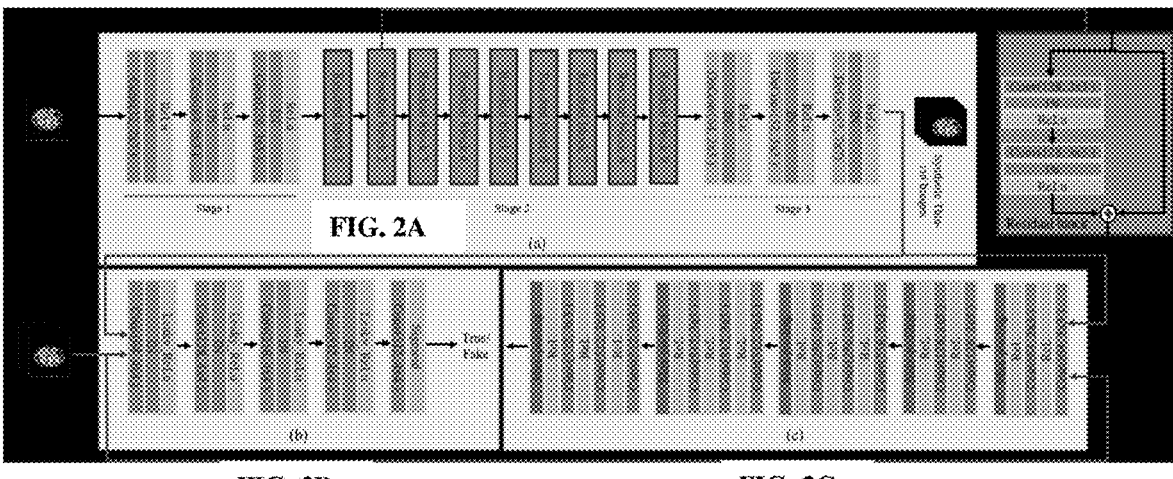
FIG. 2A
(a)
FIG. 2B
(b)
FIG. 2C
(c)

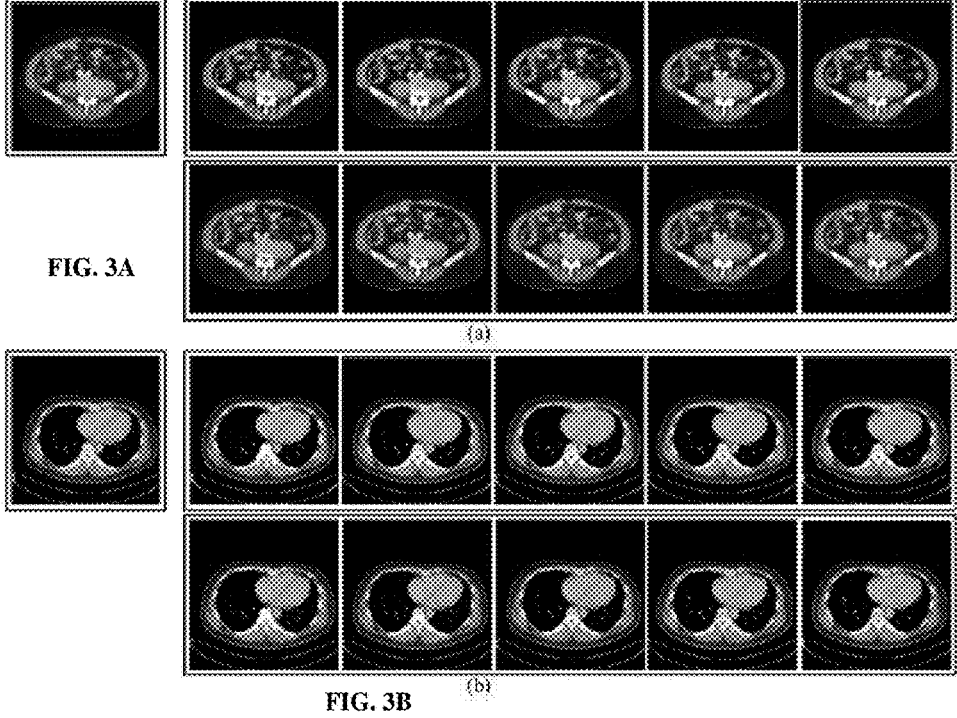
FIG. 3A
(a)
FIG. 3B
(b)
FIG. 4A
FIG. 4B
FIG. 4C
FIG. 4D (a) Histogram of real thin CT images (b) Histogram of generated thin CT images

GENERATIVE ADVERSARIAL NETWORK-BASED LOSSLESS IMAGE COMPRESSION MODEL FOR CROSS-SECTIONAL IMAGING

CROSS-REFERENCE TO RELATED PATENT APPLICATIONS

This application is a U.S. National Phase Application under 35 U.S.C. § 371 of International Patent Application No. PCT/CN2022/106185 filed on Jul. 18, 2022 and claims the benefit of U.S. Provisional Patent Application No. 63/223,766 filed on Jul. 20, 2021, the entire content of which is incorporated by reference for all purpose. The International Application was published in English on Jan. 26, 2023 as International Publication No. WO 2023/001089 under PCT Article 21(2).

TECHNICAL FIELD

The present invention relates to high-resolution computerized tomography and, more particularly, to a generative adversarial network-based lossless image compression model for cross-sectional imaging.

BACKGROUND OF THE INVENTION

The advances achieved in information technology allow for the collecting and storing of large-scale high-resolution computerized tomography (CT) images, which paves the way for employing recently developed deep learning network-based methods for assisting medical diagnosis. The quality of CT images is critical to successfully developing deep learning network-based algorithms for diagnosing liver cancer. Thin CT images whose slice thickness is less than or equal to 1 mm are used for diagnosis, while thick CT images whose slice thickness is larger than or equal to 5 mm are used for long term storage in picture archiving and communication systems (PACS) to save storage space, although they are acquired from thin slices. This inevitably results in significant information loss, especially along with the spatial direction, i.e., z-axis. Consequently, the storage scheme adopted in PACS leads to a poor quality of volumetric rendering. In FIG. 1 the obvious distortion or aliasing can be observed when viewing CT thick volumetric images FIG. 1A to FIG. 1C compared to thin CT images FIGS. 1D to 1F. Views from left to right are shown in FIG. 1B and FIG. 1E and from front to back in FIG. 1C and FIG. 1F. The areas in red boxes clearly denote the distortion or aliasing from thin to thick slices when saving CT images in PACS.

To mitigate the distortion and aliasing issue, researchers have proposed several ways to achieve virtual CT slice generation, which includes [8] Dong et al. (2014); [2] Bae et al. (2018); [14] Isola et al. (2017); [17] Kudo et al. (2019). For example, [8] Dong et al. (2014) proposed SRCNN to achieve super resolution generation for a single image. SRCNN first up-scales low-resolution images to obtain interpolated images with the same size as the ground-truth high-resolution ones, and then learns a nonlinear mapping from the interpolated and ground truth ones. Inspired by ResNet [12] He et al. (2016), [2] Bae et al. (2018) proposed a fully residual CNN-based 2.5D image generation model to reduce slice thickness's effects of CT scans on diagnosis. The success of image-to-image translation [14] Isola et al. (2017) encourages researchers to generate thin CT images from the corresponding thick ones by considering thick and thin CT images as two domains. Enlightened by the powerful capability of Generative adversarial network (GAN) ([10] Goodfellow et al. (2014)) to learn distribution of data, [17] Kudo et al. (2019) proposed a super-resolution model to synthesize virtual thin CT slice interval. Although these methods have achieved desirable performance in terms of the generation quality, they still suffer from some constraints. First, these methods required paired thick and thin CT images, which may be not available in real-world scenarios. Second, these methods still perform poorly with respect to the fine in-painting along with the z-axis direction. Third, super-resolution generation models in [17] Kudo et al. (2019); [14] Isola et al. (2017) have complex network architectures with two discriminators or two GANs, which requires enough diverse CT scans to achieve satisfactory performance.

GAN ([10] Goodfellow et al. (2014)) has attracted intensive attention from researchers with various backgrounds, due to its striking ability to generate high-quality images. As reviewed in [35] Yi et al. (2019), GAN has been used for medical image analysis successfully, where the tasks range from image reconstruction [31] Wolterink et al. (2017); [5] [6] Chen et al. (2018); [30] Wang et al. (2018), medical image synthesis [9] Frid-Adar et al. (2018); [[38] Zhang et al. (2018); [15] Jin et al. (2018), segmentation [32] Xue et al. (2018); [37] Zhang et al. (2017); [33] Yang et al. (2017), classification [27] Ren et al. (2018); [21] Madani et al. (2018) and detection [5] Chen and Konukoglu (2018); [28] Schlegl et al. (2017). Medical image synthesis can be categorized into unconditional synthesis, cross-modality synthesis and conditional synthesis. Unconditional synthesis is the simplest image generation scheme. It only feeds random noise into the generator of GAN, which includes DCGAN ([26] Radford et al. (2015)), WGAN ([1] Arjovsky et al. (2017)) and PGGAN ([16] Karras et al. (2018)). Both DCGAN and WGAN allow for super-resolution generation with up to 256×256, and PGGAN can generate images whose resolutions are 512×512 or 1024×1024. Under the assumption that variations between adjacent medical images are small, one can obtain realistic super-resolution from random noise easily with the above three GAN models.

[9] Frid-Adar et al. (2018) adopts three independent generators for synthesizing CT images with specific class-specific liver lesions (i.e., cyst, metastases and haemangiomas). It has verified that combining real and synthetic CT images with lesions can improve the classification performance. Besides, [25] Qin et al. (2020) utilized GAN to generate skin lesion as data augmentation for improvement performance in the diagnosis of skin cancer. Concerning cross-modality medical image synthesis, the typical framework for this goal is based on pix2pix ([14] Isola et al. (2017)) or CycleGAN ([39] Zhu et al. (2017)), in which two modalities of medical images are considered as source and target domains. For example, [22] Maspero et al. (2018) proposed a pix2pix based synthetic-CT generation method for pelvis MR images. [34] Yang et al. (2020) proposed an unsupervised MR-to-CT synthesis model by introducing structured-constraint into Cycle-GAN. [36] Ying et al. (2019) proposed X2CT-GAN to generate CT images from two orthogonal X-rays, which allows synthesizing volumetric scans from 2D inputs. There are research works to achieve other kinds of cross-modality transformation, such as from CT to PET ([4] Ben-Cohen et al. (2019)), from MRI to PET ([24] Pan et al. (2018)), from hyper-spectral histology to H&E ([3] Bayramoglu et al. (2017)), etc. Although these cross-modality synthesis methods have obtained remarkable performances, they generally involve transformations with two directions and the image resolutions do not increase or decrease. Conditional synthesis via imposing constraints on segmentation maps, textures, location, etc, generates images in uncommon conditions. For example, when synthesizing lung CT/MR images, lung nodules should touch the lung border ([15] Jin et al. (2018)). [11] Guibas et al. (2017) uses two GANs to generate segmentation masks from retina fundus images and photo-realistic images from generated masks. The article [23] Mok and Chung (2019) uses cGAN to synthesize more diverse brain MR images with lesions conditioned on lesion segmentation masks. Apart from these applications, researchers have tried to generate thin CT slices from thick ones. The article [2] Bae et al. (2018) proposed a fully residual convolutional network to achieve 2.5D super-resolution generation, where sub-pixel shuffle is designed to create high-resolution images. The article [11] Kudo et al. (2019) proposed a cGAN-based model to a generate thin slice, which has two discriminators to distinguish the real thin slice from thick slices and a virtual thin slice from a thick slice, respectively. Although it is possible to also achieve thick-to-thin generation using pix2pxi or CycleGAN by considering thick and thin slices as the source and target domains, both of them involve two-directional transformations, which are not necessary. Besides, [20] Liu et al. (2020) proposed a multi-stream progressive up-sampling scheme to synthesize thin CT images from thick ones, where multiple streams are responsible for learning inner and outer-lung regions.

SUMMARY OF THE INVENTION

To overcome the shortcomings of the prior art, the present invention uses an end-to-end thick-to-thin cut generation framework for CT imaging. In particular, it achieves high-quality thin-sectional image generation from thick-sections and recovers near-original radiological images from compressed low-quality ones, which allows enhancing quantitative analyses, potentially improving its diagnostic capabilities. This framework is composed of three components, namely, the generator, feature extractor and discriminator. The generator is responsible for generating high-quality thin-cut images from compressed cross-sectional ones in order to fool the discriminator. The discriminator is responsible for distinguishing real uncompressed thin-cut images from synthetic thin-cut images, which in turn promotes the generator to synthesize higher-quality thin-cut images. To improve the generation quality, a cost function of the generator is redesigned by combining pixel-wise reconstruction loss, content loss and depth estimation loss. These terms encourage the generator to synthesize thin-cut cross-sectional images as realistic as possible at different levels, including fine details at the pixel level, with the local structure preserving the global semantic information. Meanwhile, the system benefits from an adversarial mechanism between the generator and discriminator, so that the quality of the thin-cut cross-sectional images synthesized become increasingly better and close to that of real thin-cut cross-sectional images.

Among the three items, pixel-wise reconstruction loss allows for the preservation of fine details while resulting in blurring images. The content loss allows the preservation of high-level semantic information. The depth estimation loss is used to quantify the differences between the real thick-cut images and the generated thick-cut images at the pixel level and semantic level. By the use of adversarial gaming between the generator and discriminator, the invention is capable of generating high-quality lossless cross-sectional images.

In carrying out the invention, first thick-cut CT images are obtained by maximizing the pixel-wise intensity of multiple continuous thin-cut ones (e.g., five continuous thin-cut images) after image registration. Second the obtained thick CT images are fed into the generator to synthesize thin CT images. The generator includes three stages: Stage 1 is composed of three convolutional layers adapted to learn high-level semantic features, Stage 2 is composed of nine continuous residual blocks adapted to learn discriminative features, and Stage 3 is composed of three de-convolutional layers responsible for recovering fine details. Third, the real and synthetic thin CT images are fed into the discriminator to distinguish real slices from synthetic or fake slices, and the discriminator's output provides an effective gradient update of the network parameters for the generator. Thus, the generation quality capability of the generator is improved progressively, which in turn promotes the discriminator's discriminating capability via adversarial gaming between them. Fourth, a feature extractor is introduced to enforce characteristics for the synthetic thin CT images that are as close as possible to those of real thin CT in order to mitigate undesirable blurring generation. The backbone of the feature extractor is based on VGG16 ([29] Simonyan and Zisserman (2015)), while it can easily be changed to other networks like ResNet ([12] He et al. (2016)) or DenseNet ([13] Huang et al. (2017)), Xception ([7] Chollet (2017), et al.). To verify the effectiveness of the present invention, experiments were conducted on a collected 1390 liver CT scans. Three widely-used metrics (i.e., MSE, PSNR and SSIM) were used to evaluate the quality of the synthetic thin CT images. The results indicate that the present invention achieved an MSE of 57.10, a PSNR of 30.98 and a SSIM of 0.934. Further, the lesion segmentation of synthetic and real thin CT images was compared in terms of dice coefficient, in which the lesion segmentation model was trained on real thin CT images, and were found to be equivalent.

The main features of the present invention can be summarized as follows:

1. An end-to-end thick-to-thin cut generation model for CT imaging with a simple network architecture, only involving single-direction transformation and a reduced requirement for the number of training cases;

2. A feature extractor with a flexible network backbone to enforce the characteristics of the synthetic thin CT images as close as possible to those of real ones at the semantic level, mitigating undesirable blurring generation that may arise from pixel-wise reconstruction;

3. Experiments have been conducted to verify the effectiveness of the present invention from two aspects: image generation quality and liver lesion segmentation.

BRIEF SUMMARY OF THE DRAWINGS

The foregoing and other objects and advantages of the present invention will become more apparent when considered in connection with the following detailed description and appended drawings in which like designations denote like elements in the various views, and wherein:

FIGS. 1A-1F are comparisons of thick CT images (FIG. 1A, FIG. 1B, FIG. 1C) and corresponding thin CT images (FIG. 1D, FIG. 1E, FIG. 1F), where FIG. 1A and FIG. 1D denote CT images viewed from top to bottom, FIG. 1B and FIG. 1E denote CT images viewed from left to right and FIG. 1C and FIG. 1F denote CT images viewing from front to back. Areas in red boxes denote the distortion or aliasing from thin to thick slices when saving CT images in PACS;

FIGS. 2A-2C are a detailed network architecture of the present invention for a thick-to-thin generation model for CT images, where FIG. 2A, FIG. 2B and FIG. 2C denote the generator, discriminator and the feature extractor based on VGG16 for learning high-level semantic information, respectively;

FIGS. 3A and 3B show examples of thin CT images generated by the present invention when viewed them from top to bottom, where in the images of FIG. 3A are of the upper abdomen and the images of FIG. 3B are of the thorax, wherein in each group, the image in the red box denotes a single input thick CT image, images in the green box denotes the generated five continuous thin CT images, and the images in purple box denotes the ground-truth five continuous thin CT images;

FIGS. 4A-4D show examples of thin CT images generated by the present invention when viewed from front to back, where in the images of group FIG. 4A, FIG. 4B, FIG. 4C, and FIG. 4D, the first position denotes the input thick CT image, the middle position denotes the ground-truth thin CT image, and the last or right position denotes the generated thin CT images;

DETAILED DESCRIPTION

Figure 5A:
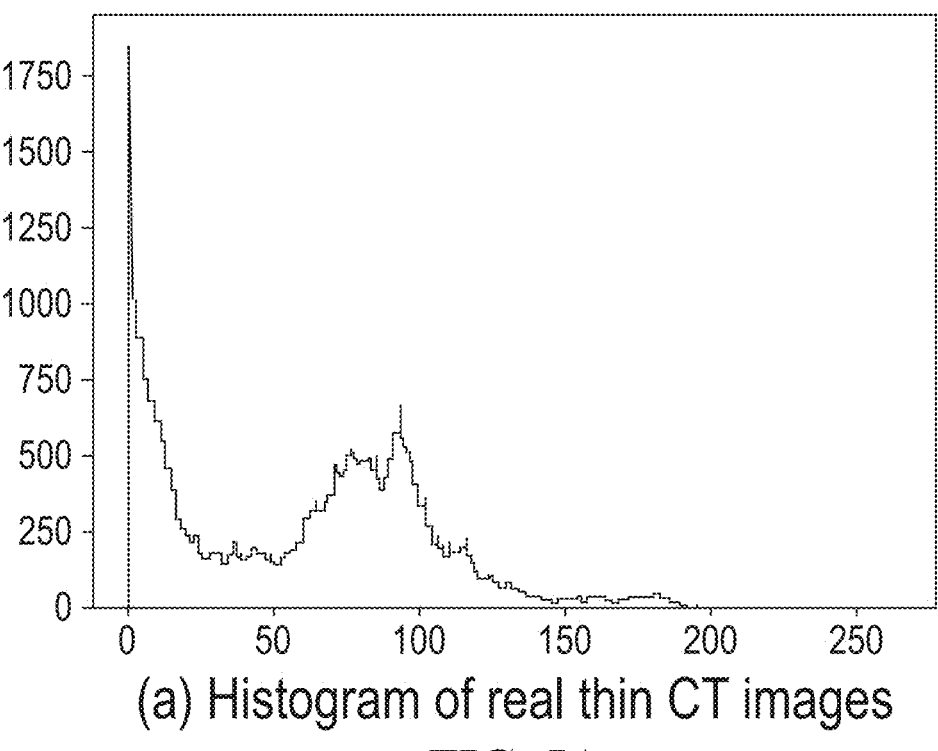
FIG. 5A is a histogram of real thin CT images and FIG. 5B is a histogram of thin CT images generated by the present invention.

The structure of the end-to-end thick to-thin generation model for CT images of the present invention is illustrated in FIG. 2. From this figure, it can be seen that the model, which may be implemented in the form of a computer with software modules, is composed of three components: the generator (FIG. 2A), discriminator (FIG. 2B) and feature extractor which is based on VGG16 for learning high-level semantic information (FIG. 2C). Specifically, the process of lossless cross-sectional image generation is divided into three stages: encoding, residual learning and decoding. The discriminator distinguishes the real thin-cut cross-sectional images from synthetic thin-cut cross-sectional images, which in turns improves the generator's synthesis capability. The feature extractor is dedicated to quantifying divergence of high-level semantic information between real thick-cut cross-sectional images and ones derived from synthetic thin-cut cross-sectional images.

To understand the underlying algorithm, suppose $X^{thick} \in R^{W \times H \times n}$ denotes a single channel thick-cut CT image, the goal of the model is to synthesize n continuous thin-cut CT images $$X_{gen}^{thin} \in R^{W \times H \times n},$$

so that synthetic n images are as realistic of the ground-truth thin-cut $$X_{real}^{thin} \in R^{W \times H \times n}$$

as possible. In other words, the model is dedicated to increasing the spatial resolution. The generator, discriminator and the feature extractor are denoted as $G_{\theta_G}$, $D_{\theta_D}$ and $F_{\theta_F}$, where $\theta_G$, $\theta_G$ and $\theta_F$ represent their parameters, respectively.

The generator, whose architecture is shown in FIG. 2A, synthesizes thin-cut CT images from original thick-cut ones. The generator is split into three stages. Stage 1 is composed of three convolutional layers, each of which is followed by instance normalization. This stage learns high-level semantic features from thick-cut CT images. Inspired by ResNet, Stage 2 adopts nine continuous residual blocks to learn discriminative features as inputs to Stage 3, which is responsible for synthesizing thin-cut CT images. Stage 3 includes three de-convolutional layers for restoring the size of features gradually until the size of the output is equal to that of the original thick-cut ones. Practically, one can replace these de-convolutional layers with up-sampling layers. Stages 1 and 3 in the generator can be considered as the paired encoder and decoder blocks. The synthetic thin-cut CT images from the generator have two different information flows. One is fed into the discriminator and the other one is fed into the feature extractor along with the original thick-cut CT images. With these two information flows, the objective function for the generator can be defined by:

$$\mathcal{L}_{gen} = \min_{\theta_G} \left( \mathbb{E}_{X^{thick} \sim p^{thick}} \left[ \log \left( 1 - D_{\theta_D} \left( G_{\theta_G} \left( X^{thick} \right) \right) \right) \right] + \mathcal{L}_{rec} \right), \quad (1)$$

here $p^{thick}$ is the distribution of thick-cut CT images, and $\mathcal{L}_{rec}$ is the reconstruction loss, which measures the overall differences between the generated and ground-truth thin-cut CT images at the pixel level and is defined by:

$$\mathcal{L}_{rec} = \frac{1}{nWH} \sum_{k=1}^{n} \sum_{x=1}^{W} \sum_{y=1}^{H} \left( X_{real|(x,y,k)}^{thin} - X_{gen|(x,y,k)}^{thin} \right)^2, \quad (2)$$

where $$X_{gen=}^{thin} G_{\theta_G} \left( X^{thick} \right) \text{ and } X_{gen(x,y,k)}^{thin}$$

denotes the pixel value at the $x^{th}$ row, the $y^{th}$ column of the $k^{th}$ thin-cut CT image.

The discriminator aims to distinguish whether input CT images are real or synthetic. With the training process continuing, the capability of the discriminator to identify real CT images from synthetic ones is progressively strengthened. Thus, it can provide gradient updates for the generator to synthesize increasingly higher quality CT images, which in turn further improve the discriminator's capability in distinguishing real from synthetic images. The objective function of the discriminator can be given by:

$$\mathcal{L}_{dis} = \max_{\theta_D} \mathbb{E}_{X^{thin} \sim p^{thin}} \left[ \log D_{\theta_D} \left( X_{real}^{thin} \right) \right] + \quad (3)$$

$$\mathbb{E}_{X^{thick} \sim p^{thick}} \left[ \log \left( 1 - D_{\theta_D} \left( G_{\theta_G} \left( X^{thick} \right) \right) \right) \right],$$

where $pt^{thin}$ denotes the distribution of real thin-cut CT images.

By means of adversarial gaming between the generator and discriminator, the generated thin-cut CT images gradually become as realistic as real thin-cut ones. However, it is observed that the optimization solutions of reconstruction loss in Eq.(1) at the pixel level lead to a lack of high-frequent content, which results in generating unsatisfying blurring CT images characterized by excessively smooth textures.

To mitigate the undesirable blurring caused by the pixel-wise reconstruction loss, the introduction of perceptual loss is considered, which measures the differences between high-level feature representations learned by pre-trained convolutional networks. The definition of perceptual loss is given as below;

$$\mathcal{L}_{per} = \mathcal{L}_{fea} + \lambda \mathcal{L}_{depth}, \tag{4}$$

where $\lambda$ is a trade-off parameter. $L_{fea}$ denotes the reconstruction losses of high-level feature representations, and $L_{depth}$ denotes the depth estimation loss of high-level feature representations. These two items are defined as below:

$$\mathcal{L}_{fea} = \frac{1}{C_j W_i H_j} \sum_{c=1}^{C_j} \sum_{x=1}^{W_j} \sum_{y=1}^{H_j} \left( \phi\left(X_{real}^{thin}\right)_{(c,x,y)} - \phi\left(X_{gen}^{thin}\right)_{(c,x,y)} \right)^2 \tag{5}$$

$$\mathcal{L}_{depth} = \left\| \mathcal{G}_j^{\phi}\left(X_{real}^{thin}\right) - \mathcal{G}_j^{\phi}\left(X^{thick}\right) \right\|_F^2,$$

where $$\phi\left(X_{gen}^{thin}\right) \text{ and } \phi\left(X_{gen}^{thin}\right)$$

denote feature maps learned by a deep learning convolutional network $\varnothing$ for real thin-cut CT images $$X_{gen}^{thin}$$

and generated ones $$X_{gen}^{thin},$$

and its shape is $C_j \times W_j \times H_j$; $C_j$ denotes the number of channels; $W_j$ and $H_j$ denote the width and height. $\varnothing(X)_{(c;x;y)}$ denotes the $(x; y)$ element in the $c^{th}$ channel.

$$G_j^{\phi}\left(X_{real}^{thin}\right) \text{ and } G_j^{\phi}\left(X^{thicl}\right)$$

denote Gram matrices for $$\phi\left(X_{rea;}^{thin}\right)$$

and $\varnothing(X^{thick})$ with the shape $C_j \times C_j$, whose element is defined by:

$$\mathcal{G}_i^{\phi}\left(X_{real}^{thin}\right)_{c,c'} = \frac{1}{C_j W_i H_j} \sum_{x=1}^{W_j} \sum_{y=1}^{H_j} \phi\left(X_{real}^{thin}\right)_{(c,x,y)} \phi\left(X_{gen}^{thin}\right)_{(c',x,y)} \tag{6}$$

Experiments were conducted to evaluate the effectiveness of the model of the present invention. The experiments included two aspects: the evaluation of image generation quality in terms of MSE, PSNR and SSIM, and lesion segmentation evaluation in terms of dice coefficient. For the image generation task, the Adam optimizer was adopted to optimize the cost function of the model with $\beta_1 = 0:9$ and $\beta 2 = 0:999$. The learning rate was set to 0.0002 initially and the total epochs was set to 120. The batch size was set to 6. For the liver lesion segmentation task, the Adam optimizer was adopted to optimize the cost function of the model with $\beta_1 = 0:9$ and $\beta 2 = 0:999$. The learning rate was set to 0.001 initially and the total epochs was set to 100. The batch size was set to 16. The networks of both tasks were employed on a single NVIDIA Tesla V100 GPU with 32 GB memory, using a tensor flow deep learning library.

For the experiment a total of 1390 volumetric thin-cut CT images were collected. The slice thickness was 1 mm, from multiple centers in order to evaluate the effectiveness of the approach. The ratio of the training set (973) to the testing set (417) was 0.7 vs. 0.3. Since liver CT scans were acquired by following different protocols, there existed significant differences in image intensities. For example, image intensities of CT scans from Center 1 were in the interval [−2048, 2048] in terms of Hounsfield units, image intensities of CT scans from Center 2 were in the interval [−3023, 2137], while image intensities of CT scans from Center 3 were in the interval [−1024, 3071]. Thus, after resizing the resolution of the CT scans, the intensities were truncated to the internal [40, 400], followed by normalizing to the interval from 0 to 255. Two kinds of procedures were adopted to obtain thick-cut CT images: 1) maximizing pixel-wise intensity of five continuous CT images; and 2) averaging pixel-wise intensity of five continuous CT images. The slice thickness of thick-cut CT images was 5 mm. This results in 65826 and 31846 thick-cut CT images for testing, respectively.

The metrics, MSE PSNR SSIM used for evaluating the generation quality are defined as below:

$$MSE = \frac{1}{NHW} \sum_{c=1}^{N} \sum_{i=1}^{H} \sum_{j=1}^{W} \left( X_{real|(c,x,y)}^{thin} - X_{gen|(c,x,y)}^{thin} \right)^2, \tag{7}$$

where N denotes the total number of thin CT slices.

$$PSNR = 10 \log_{10} \left( \frac{MAX_j^2}{MSE} \right), \tag{8}$$

where $MAX_1$ denotes the maximum possible pixel value of the images.

$$SSIM = \frac{(2\mu_{real}\mu_{gen} + c_1)(2\sigma_{real-gen} + c_2)}{\left(\mu_{real}^2 + \mu_{gen}^2 + c_1\right)\left(\sigma_{real}^2 + \sigma_{gen}^2 + c_2\right)}, \tag{9}$$

where $\mu_{real}$ and $\mu_{gen}$ denote averages of real and synthetic thin CT images, respectively.

$$\sigma^2_{real} \text{ and } \sigma^2_{gen}$$

denote variances of real and synthetic thin CT images, respectively.

$$\sigma_{real\text{-}gen}$$

denotes the covariance of real and synthetic thin CT images. $c_1$ and $c_2$ are two variables to stabilize the division with weak denominator. Dice coefficient (DC) used for evaluating the liver lesion segmentation is defined as below:

$$DC(Y, Y') = \frac{2|Y \cap Y'|}{|Y| + |Y'|}, \qquad (10)$$

where Y and Y' denote the ground-truth and predicted segmentation masks of thin CT image, respectively.

Basically, for MSE, a smaller value indicates a better performance. For PSNR, SSIM and DC, a lager value indicates a better performance. The interval ranges from SSIM and DC are [0,1], while the interval of PSNR is [0, +∞].

To verify the generation quality of method of the present invention, it was compared with several competing methods, including bicubic, SRGAN ([18] Ledig et al. (2017)), SRResNet ([18] Ledig et al. (2017)), SRCNN ([2] Bae et al. (2018)), pix2pix ([14] Isola et al. (2017)), VTS ([17] Kudo et al. (2019)) and MsPUs ([20] Liu et al. (2020)). The detailed comparison results are shown in Table 1. In this table, it can be seen that the comparison results when using two kinds of thick CT images (Maximum and Average), and the model of the present invention achieved the best performance in both cases, as indicated in bold font style.

TABLE 1

Comparison Results between competing models and our proposed mode in terms of MSE, PSNR and SSIM.

| Model Name | Maximum | | | Average | | |
|---|---|---|---|---|---|---|
| | MSE | PSNR | SSIM | MSE | PSNR | SSIM |
| Bicubic | 72.64 | 28.86 | 0.895 | 66.78 | 30.21 | 0.908 |
| SRGAN | 70.63 | 30.35 | 0.915 | 64.84 | 31.09 | 0.921 |
| SRResNet | 68.29 | 30.52 | 0.917 | 61.57 | 31.64 | 0.929 |
| SRCNN | 68.95 | 29.05 | 0.918 | 63.45 | 30.83 | 0.924 |
| pix2pix | 67.82 | 29.96 | 0.920 | 58.46 | 31.86 | 0.927 |
| VTS | 68.44 | 30.60 | 0.924 | 59.15 | 31.80 | 0.923 |
| msPUs | 66.75 | 30.47 | 0.928 | 53.47 | 32.34 | 0.934 |
| Present Invention | 57.10 | 30.98 | 0.934 | 37.33 | 33.27 | 0.950 |

Specifically, among the competing methods, bicubic, which conducts up-sampling on thick CT images to the shape of thin ones by considering 4×4 pixels simply, obtains the worse performance. Consequently, bicubic cannot effectively utilize statistical information about the thick CT images during bicubic interpolation. SRGAN and SRResNet introduce adversarial gaming mechanism in the image super-resolution generation, achieving a better quality than bicubic. SRCNN, which works on paired thick-thin CT images along with the spatial direction without using GAN, achieves comparable performance to SRGAN and SRRes- Net. Pix2pix has achieved slightly better performances in terms of MSE and SSIM, compared with SRGAN, SRResNet and SRCNN. The difference between pix2pix and SRGAN/SRResNet lies in that the former adopts two GAN for two-direction transformations while the latter adopts single GAN focusing on one-direction transformation. In other words, pix2pix has a more complex network architecture. Differently, VTS adopts two discriminators whose roles are to distinguish real/virtual CT images from thick ones, rather than distinguishing real thin CT images from virtual thin ones. The msPUs adopts a multi-stream up-sampling strategy to increase spatial resolution progressively, where the streams focus on interior and exterior of lung areas. This strategy allows msPUs to achieve the second-best MSE and SSIM, which are 66.75 and 0.928, respectively.

The present invention can obtain an MSE of 57.10, a PSNR of 30.98 and a SSIM of 0.934, which are better than the second-best results by 9.65, 0.38 and 0.06, respectively, in terms of MSE, PSNR and SSIM. All of these observations are based on thick CT images obtained by maximizing pixel-wise intensity. Similar observations are made when thick CT images are obtained by averaging pixelwise intensity. The only difference achieved by these two kinds of thick CT images is that averaging pixel-wise intensity allows much better performance than maximizing pixel-wise intensity. For example, the present invention has achieved an MSE of 37.33, a PSNR of 33.27 and a SSIM of 0.950 when using averaged-version thick CT images. Compared to results on maximized-version thick CT images, it improves MSE, PSNR and SSIM by 19.77, 2.29 and 0.016, respectively.

Apart from quantitative results in Table 1, FIG. 3 illustrates some examples of thin CT images generated by the present invention. Specifically, FIG. 3 displays comparative examples between real thin and generated thin CT images (five continuous slices) when viewed them from top to bottom. FIG. 4 displays comparative examples between real thin and generated thin CT images when viewed them from front to back. In FIG. 3A it can be observed that the present invention has successfully synthesize five continuous thin CT images from single thick CT image, and the quality of generated thin CT images is satisfactory, compared with corresponding ground-truth ones. The images of FIG. 3A are of the upper abdomen and the images of FIG. 3B are of the thorax. In each of FIGS. 3A and 3B, the image in the red box to the left denotes the single input thick CT image, images in the green box along the top row denotes the generated five continuous thin CT images, and the images in purple box along the lower row denotes the ground-truth five continuous thin CT images.

From FIGS. 4A to 4D, it can be easily seen that obvious aliasing appearance in thick CT images (first column of each), which is significantly different from the corresponding thin CT images (second column of each). The images are from front to back in FIGS. 4A and 4C, as well as in FIGS. 4B to 4C. The images of the present invention (third column of each) have nearly perfectly recovered thin CT images from the thick ones as can be seen by comparing the second and third columns of each group in FIG. 4. Comparing the first and third columns of each group in this figure, it can be seen that the present invention has conducted fine detailed filling and mitigated the issue of aliasing phenomenon in the thick CT images. Although there is slight blurring in the generated thin CT images viewed from top to bottom, this can be addressed by introducing either an attention mechanism or efficient network architectures.

Figure 5B:
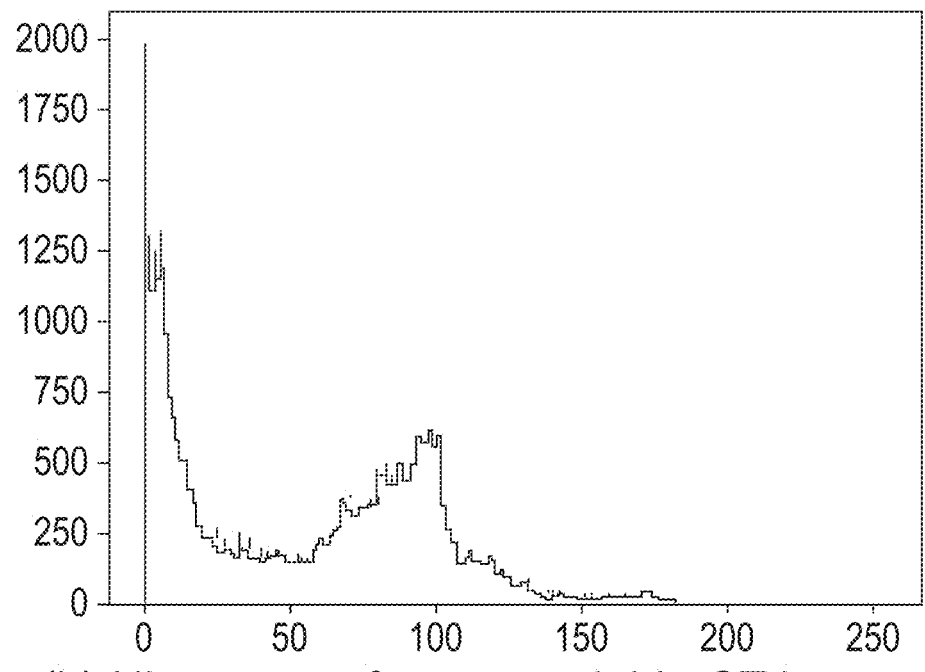

Histograms of real and synthetic thin CT images are shown in FIGS. 5A and 5B, respectively. It can be observed that the histogram of the synthetic thin CT images is roughly equivalent to the histogram of real thin CT images, especially when the pixel values are lower than 50 or larger than 150. While there exists some divergences between the histogram of the real and synthetic CT images when pixel values vary in the interval [75; 125], since the present invention has focused on the liver scans only and does have any prior concerning statistics differences between organs, the differences are not seen to be material. Utilizing an attention mechanism or other prior techniques could be beneficial in addressing the issue.

An effort was made to verify whether a pre-trained liver lesion segmentation model can achieve desirable performance on synthetic thin CT images. Specifically, first a segmentation model DenseUNet ([19] Li et al. (2018)) was trained on real thin CT images that correspond to cases in the training set. Then the segmentation performance was evaluated on real and generated thin CT images according to the invention by using the trained model directly. The comparison results are shown in Table 2. The difference between performances of liver lesion segmentation on real and generated thin CT images is 0.7% globally, which is very small. This indicates that the quality of generated thin CT images is so good that a segmentation model pre-trained on real thin CT images can be easily used to form synthetic ones.

TABLE 2

Comparison of liver lesion segmentation
in terms of dice coefficient (DC).

| | real thin CT images | Generated thin CT images |
|---|---|---|
| global | 0.836 | 0.829 |
| per case | 0.765 | 0.756 |

Figures 6A, 6B:
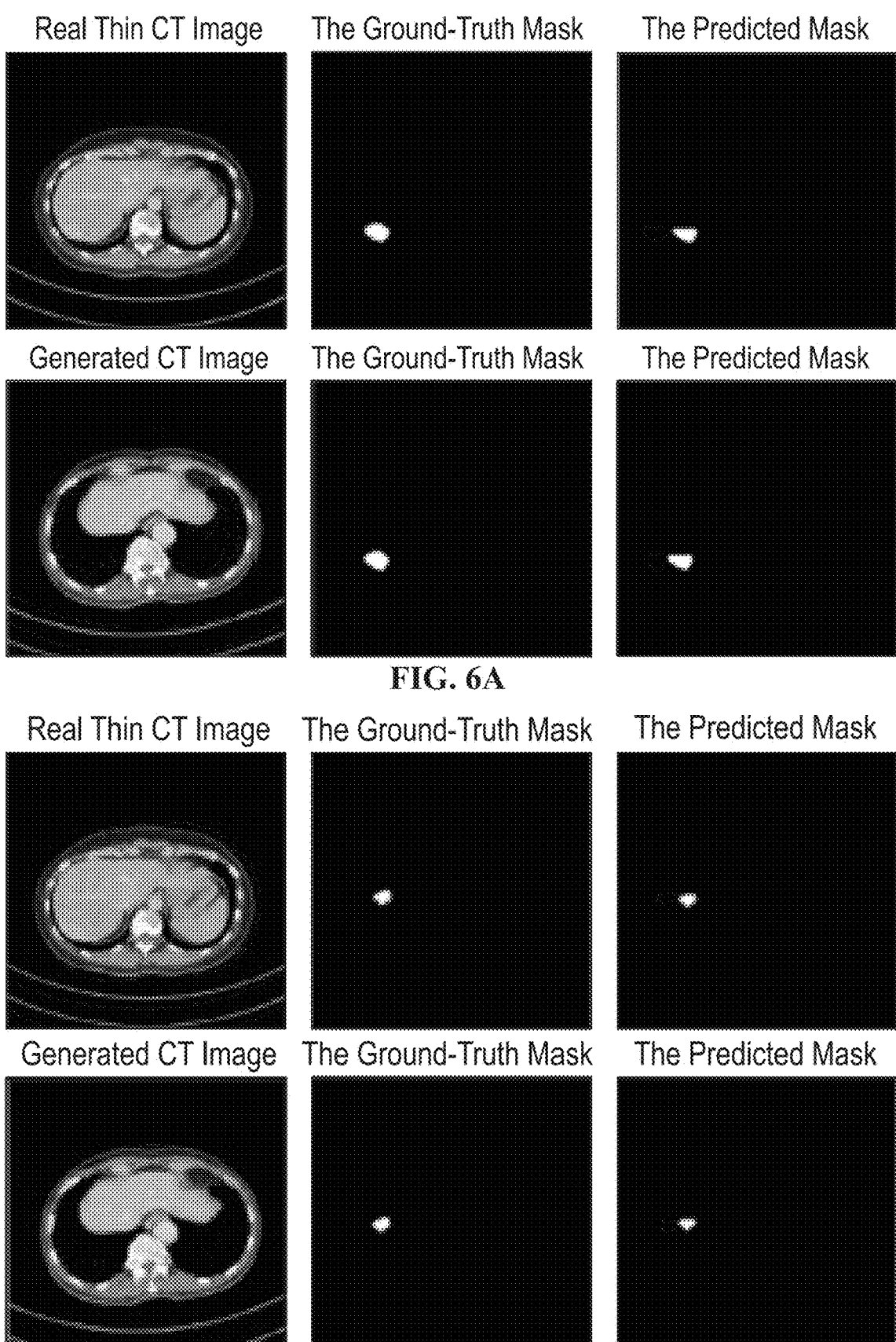
FIG. 6A shows images of examples of liver lesion segmentation results generated by the present invention that includes part of the liver.
FIG. 6B shows images of examples of liver lesion segmentation results generated by the present invention that includes part of the liver, where in each group, images in the first column denote the real (top row) and generated (bottom row) thin CT image; images in the second column denote the ground-truth masks for real (top row) and generated (bottom row) thin CT images, and images in the third column denote the predicted masks for real (top row) and generated (bottom row) thin CT images.

Additionally, comparison examples of lesion segmentation between real and synthetic thin CT images are shown in FIGS. 6A and 6B. In FIG. 6A the top of the first column is the real thin CT image and the bottom is the generated thin CT image. The second column has the ground truth mask in the top and bottom locations. The third column has the predicted mask in the top and bottom locations. FIG. 6B has the same arrangement. It can be seen that the pre-trained segmentation model has predicted the masks of liver lesion. The largest dimension of the masks predicted for the synthetic thin CT images agree with those for the real thin ones. It is noteworthy that at the case level, the segmentation model has achieved dice coefficient of 0.765 and 0.756 on real and synthetic thin CT images respectively. In other words, the difference is 0.9% at the case level. The reason is that the quality of synthetic thin CT images is far poorer than the average quality, since image registration is not considered before super resolution generation. In real thin CT images, the majority of cases focus on liver areas, while there are a small number of cases that cover the areas from neck to pelvis. As a result, the quality of the generated thin CT images for the minority cases are poorer, which inevitably has negative effects on lesion segmentation.

Based on a collection of 1390 CT images whose slice thickness is 1 mm, the present invention has achieved the mean square error (MSE) of 69.830, structural similarity (SSIM) of 0.920, and peak signal noise ratio (PSNR) of 30.050 respectively, all of which are much better or at least comparable to those of related methods, from the perspective of image quality evaluation.

The present invention provides an end-to-end generation scheme to generate high-quality thin-cut CT images from thick-cut ones. The framework has three components, namely, the generator, discriminator and feature extractor. The generator includes three stages responsible for learning high-level semantic features, learning discriminative features and recovering high-resolution images along with the spatial direction, respectively. The discriminator aims to distinguish synthetic thin CT images from real ones and provide effective gradient updates for the generator, thereby improving the generation quality. The feature extractor is introduced to mitigate the unsatisfactory blurring caused by pixel-wise reconstruction through forcing statistics information of synthetic thin CT images as close to those of real ones as possible. Experiments verify the effectiveness of the present invention, including image quality evaluation and liver lesion segmentation, and demonstrate that the invention can generate high-quality thin CT images from thick ones.

It should be noted that the present invention differs from Virtual Thin Slice (VTS) [17] Kudo et al. (2019) in two aspects: (a) VTS includes two discriminators for distinguishing synthetic thick and thin images from real thick and thin images respectively, while the present invention only involves one discriminator; (b) VTS only adopts L1-loss at the pixel-wise appearance difference, while the present invention includes three losses, responsible for penalizing pix-wise difference, semantic preservation, and depth estimation error. The method in [40] Park belongs to a one-to-one generation (i.e., 2D model), while the present invention belongs to one-to-many generation (2.5D model) and is easily extended into a 3D model. The method in [41] Xie, et al. focuses on image reconstruction from low-count to high-count PET (one-to-one), and image resolution does not change. The method in [42] Han focuses on generating CT images from MR images using deep convolutional auto-encoder, which does not involve image reconstruction in spatial direction. A similar work can be found in [44] Han. Both [42] Han and [43] Nie cannot achieve image reconstruction along with the z-axis (spatial) direction, while the present invention can achieve this goal. Unlike the method of [44] You et al., which involves two-direction transformations between low-resolution to high-resolution in 2D space using a pair of generative adversarial networks, with the present invention there is only one generative adversarial network, which is much simpler with less computational burden and model complexity.

The potential impact of this invention include: (a) substantial reduction in the space and costs needed to store CT images, (b) facilitation of telemedicine and mobile technology and (c) the curation of high-quality image datasets that can utilize historic data while also being future compatible. Even with the current compression ratio and thick-slice reconstruction, conversion of all thin-slice images to thick-slice, the present invention is estimated to achieve a 55% total volumetric data saving in each radiology department. For large healthcare ecosystems like Medicare, which spend up to USD$10 billion annually on medical imaging and a significant proportion of costs associated with data storage, there would be a substantial cost reduction. Further, the AI market in healthcare is expected to reach USD$31.3 billion by 2025 growing at a compound annual growth rate of 41.5%. The present invention would help to reduce the costs to public healthcare systems.

While high resolution medical images are necessary for accurate diagnosis and treatment planning, transfer of these images from one center to other, commonly required for telemedicine purposes requires large bandwidth and large storage space in multiple PACS memory. The proliferation of mobile image apps for image acquisition and interpretation faces similar bottlenecks. The present invention provides a means to compress medical images within the current framework and workflow while at the same time allowing new technology to be adopted without compatibility issues.

Although medical images have been digitalized for over a decade, for cross-sectional images (e.g. CT), especially older data, they are typically stored in low resolution and reconstructed into thick-slices for storage and achieving purposes. Compared with the high resolution thin-slice images that modern scanner produced, there are several limitations on these older stored images and they have shown to affect quantitative analysis on CT images, thus having a significant impact on big data analysis and AI development. The ability of the present invention to convert these older thick images back to thin-slice images thus allows the curation of high-quality image datasets that can utilize historic data while also future compatible.

The cited references in this application are incorporated herein by reference in their entirety and are as follows:

[1] Arjovsky, M., Chintala, S., Bottou, L., 2017. Wasserstein generative adversarial networks, in: International conference on machine learning, PMLR. pp. 214-223.

[2] Bae, W., Lee, S., Park, G., Park, H., Jung, K. H., 2018. Residual cnn-based image super-resolution for ct slice thickness reduction using paired ct scans: preliminary validation study.

[3] Bayramoglu, N., Kaakinen, M., Eklund, L., Heikkil, J., 2017. Towards virtual h e staining of hyperspectral lung histology images using conditional generative adversarial networks, IEEE International Conference on Computer Vision Workshops (ICCVW), pp. 64-71.

[4] Ben-Cohen, A., Klang, E., Raskin, S. P., Soffer, S., Ben-Haim, S., Konen, E., Amitai, M. M., Greenspan, H., 2019. Cross-modality synthesis from ct to pet using fcn and gan networks for improved automated lesion detection. Engineering Applications of Artificial Intelligence 78, 186-194.

[5] Chen, X., Konukoglu, E., 2018. Unsupervised detection of lesions in brain mri using constrained adversarial auto-encoders, in: MIDL Conference book, MIDL.

[6] Chen, Y., Shi, F., Christodoulou, A. G., Xie, Y., Zhou, Z., Li, D., 2018. Efficient and accurate mri super-resolution using a generative adversarial network and 3d multi-level densely connected network, in: International Conference on Medical Image Computing and Computer-Assisted Intervention, pp. 91-99.

[7] Chollet, F., 2017. Xception: Deep learning with depthwise separable convolutions, 2017 IEEE Conference on Computer Vision and Pattern Recognition (CVPR), pp. 1800-1807.

[8] Dong, C., Loy, C. C., He, K., Tang, X., 2014. Learning a deep convolutional network for image super-resolution, European conference on computer vision, Springer. pp. 184-199.

[9] Frid-Adar, M., Diamant, I., Klang, E., Amitai, M., Goldberger, J., Greenspan, H., 2018. GAN-based synthetic medical image augmentation for increased cnn performance in liver lesion classification. Neurocomputing 321, 321-331.

[10] Goodfellow, I. J., Pouget-Abadie, J., Mirza, M., Xu, B., Warde-Farley, D., Ozair, S., Courville, A., Bengio, Y., 2014. Generative adversarial nets, pp. 2672-2680.

[11] Guibas, J. T., Virdi, T. S., Li, P. S., 2017. Synthetic medical images from dual generative adversarial networks. arXiv preprint arXiv:1709.01872.

[12] He, K., Zhang, X., Ren, S., Sun, J., 2016. Deep residual learning for image recognition, in: Proceedings of the IEEE conference on computer vision and pattern recognition, pp. 770-778.

[13] Huang, G., Liu, Z., Van Der Maaten, L., Weinberger, K. Q., 2017. Densely connected convolutional networks, IEEE Conference on Computer Vision and Pattern Recognition (CVPR), pp. 2261-2269.

[14] Isola, P., Zhu, J. Y., Zhou, T., Efros, A. A., 2017. Image-to-image translation with conditional adversarial networks, in: Proceedings of the IEEE conference on computer vision and pattern recognition, pp. 1125-1134.

[15] Jin, D., Xu, Z., Tang, Y., Harrison, A. P., Mollura, D. J., 2018. CT-realistic lung nodule simulation from 3d conditional generative adversarial networks for robust lung segmentation, in: International Conference on Medical Image Computing and Computer-Assisted Intervention, Springer. pp. 732-740.

[16] Karras, T., Aila, T., Laine, S., Lehtinen, J., 2018. Progressive growing of gans for improved quality, stability, and variation, in: International Conference on Learning Representations.

[17] Kudo, A., Kitamura, Y., Li, Y., Iizuka, S., Simo-Serra, E., 2019. Virtual thin slice: 3d conditional gan-based super-resolution for CT slice interval, pp. 91-100.

[18] Ledig, C., Theis, L., Husz'ar, F., Caballero, J., Cunningham, A., Acosta, A., Aitken, A., Tejani, A., Totz, J., Wang, Z., et al., 2017. Photo-realistic single image super-resolution using a generative adversarial network, in: Proceedings of the IEEE conference on computer vision and pattern recognition, pp. 4681-4690.

[19] Li, X., Chen, H., Qi, X., Dou, Q., Fu, C. W., Heng, P. A., 2018. H-denseunet: Hybrid densely connected unet for liver and tumor segmentation from ct volumes. IEEE Transactions on Medical Imaging 37, 2663-2674.

[20] Liu, Q., Zhou, Z., Liu, F., Fang, X., Yu, Y., Wang, Y., 2020. Multi-stream progressive up-sampling network for dense ct image reconstruction, in: Medical Image Computing and Computer Assisted Intervention—MICCAI, Springer International Publishing. pp. 518-528.

[21] Madani, A., Moradi, M., Karargyris, A., Syeda-Mahmood, T., 2018. Semisupervised learning with generative adversarial networks for chest x-ray classification with ability of data domain adaptation, IEEE 15th International Symposium on Biomedical Imaging, pp. 1038-1042.

[22] Maspero, M., Savenije, M. H. F., Dinkla, A. M., Seevinck, P. R., Intven, M. P. W., Jurgenliemk-Schulz, I. M., Kerkmeijer, L. G. W., van den Berg, C. A. T., 2018. Dose evaluation of fast synthetic-CT generation using a generative adversarial network for general pelvis MR-only radiotherapy. Physics in Medicine & Biology 63, 185001.

[23] Mok, T. C. W., Chung, A. C. S., 2019. Learning data augmentation for brain tumor segmentation with coarse-to-fine generative adversarial networks, in: Brainlesion: Glioma, Multiple Sclerosis, Stroke and Traumatic Brain Injuries, Springer International Publishing. pp. 70-80.

[24] Pan, Y., Liu, M., Lian, C., Zhou, T., Xia, Y., Shen, D., 2018. Synthesizing missing PET from MRI with cycle-consistent generative adversarial networks for alzheimer's disease diagnosis, in: Medical Image Computing and Computer Assisted Intervention—MICCAI, pp. 455-463.

[25] Qin, Z., Liu, Z., Zhu, P., Xue, Y., 2020. A gan-based image synthesis method for skin lesion classification. Computer Methods and Programs in Biomedicine 195, 105568.

[26] Radford, A., Metz, L., Chintala, S., 2015. Unsupervised representation learning with deep convolutional generative adversarial networks. arXiv preprint arXiv: 1511.06434.

[27] Ren, J., Hacihaliloglu, I., Singer, E. A., Foran, D. J., Qi, X., 2018. Adversarial domain adaptation for classification of prostate histopathology wholeslide images, in: International Conference on Medical Image Computing and Computer-Assisted Intervention, Springer. pp. 201-209.

[28] Schlegl, T., Seebock, P., Waldstein, S. M., Schmidt-Erfurth, U., Langs, G., 2017. Unsupervised anomaly detection with generative adversarial networks to guide marker discovery, in: International conference on information processing in medical imaging, Springer. pp. 146-157.

[29] Simonyan, K., Zisserman, A., 2015, Very deep convolutional networks for large-scale image recognition, in: 3rd International Conference on Learning Representations, ICLR 2015.

[30] Wang, Y., Yu, B., Wang, L., Zu, C., Lalush, D. S., Lin, W., Wu, X., Zhou, J., Shen, D., Zhou, L., 2018. 3d conditional generative adversarial networks for high-quality pet image estimation at low dose. Neuroimage 174, 550-562.

[31] Wolterink, J. M., Leiner, T., Viergever, M. A., Isgum, I., 2017. Generative adversarial networks for noise reduction in low-dose CT. IEEE Transactions on Medical Imaging 36, 2536-2545.

[32] Xue, Y., Xu, T., Zhang, H., Long, L. R., Huang, X., 2018. Segan: Adversarial network with multi-scale L1 loss for medical image segmentation. Neuroinformatics 16, 383-392.

[33] Yang, D., Xu, D., Zhou, S. K., Georgescu, B., Chen, M., Grbic, S., Metaxas, D., Comaniciu, D., 2017. Automatic liver segmentation using an adversarial image-to-image network, in: International Conference on Medical Image Computing and Computer-Assisted Intervention, Springer. pp. 507-515.

[34] Yang, H., Sun, J., Carass, A., Zhao, C., Lee, J., Prince, J. L., Xu, Z., 2020. Unsupervised MR-to-CT synthesis using structure-constrained cyclegan. IEEE Transactions on Medical Imaging 39, 4249-4261.

[35] Yi, X., Walia, E., Babyn, P., 2019. Generative adversarial network in medical imaging: A review. Medical Image Analysis 58, 101552.

[36] Ying, X., Guo, H., Ma, K., Wu, J., Weng, Z., Zheng, Y., 2019. X2ct-gan: reconstructing ct from biplanar x-rays with generative adversarial networks, in: Proceedings of the IEEE/CVF Conference on Computer Vision and Pattern Recognition, pp. 10619-10628.

[37] Zhang, Y., Yang, L., Chen, J., Fredericksen, M., Hughes, D. P., Chen, D. Z., 2017. Deep adversarial networks for biomedical image segmentation utilizing unannotated images, in: International Conference on Medical Image Computing and Computer-Assisted Intervention, Springer. pp. 408-416.

[38] Zhang, Z., Yang, L., Zheng, Y., 2018. Translating and segmenting multimodal medical volumes with cycle- and shape-consistency generative adversarial network, in: Proceedings of the IEEE conference on computer vision and pattern Recognition, pp. 9242-9251.

[39] Zhu, J. Y., Park, T., Isola, P., Efros, A. A., 2017, Unpaired image-to-image translation using cycle-consistent adversarial networks, IEEE International Conference on Computer Vision (ICCV).

[40] Park, et al.: Computed tomography super-resolution using deep convolutional neural network.

[41] Z. Xie, et al.: Generative adversarial network-based regularized image reconstruction for PET.

[42] Xiao Han: MR-based synthetic CT generation using a deep convolutional neural network method.

[43] D. Nie, et al.: Medical Image Synthesis with Context-Aware Generative Adversarial Networks

[44] C. You, et al.: CT Super-resolution GAN Constrained by the Identical, Residual, and Cycle Learning Ensemble (GAN-CIRCLE)

While the invention is explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

The invention claimed is:

1. An end-to-end thick-to-thin cut generation computer framework for CT imaging to recover near-original thin radiological images from compressed low-quality thick radiological images, comprising:

a generator module responsible for generating synthetic high-quality thin-cut images from compressed cross-sectional low-quality thick radiological images;

a discriminator module that receives real and synthetic thin CT images and which distinguishes real uncompressed thin-cut images from synthetic thin-cut images; and an adversarial mechanism between the generator and discriminator that causes an output of the discriminator to provide an effective gradient update of the network parameters for the generator to increasingly improve the generator's ability to synthesize higher-quality thin-cut images and in turn promotes the discriminator's discriminating capability, whereby the generator module's quality is improved by a cost function that combines pixel-wise reconstruction loss, content loss and depth estimation loss.

2. The thin cut generation computer framework according to claim 1 wherein pixel-wise reconstruction loss allows for the preservation of fine details while resulting in blurring images, the content loss allows the preservation of high-level semantic information, and the depth estimation loss is used to quantify the differences between the real thick-cut images and the generated synthetic thick-cut images at the pixel level and semantic level.

3. The thin cut generation computer framework according to claim 1 wherein first thick-cut CT images are obtained by maximizing the pixel-wise intensity of multiple continuous thin-cut images after image registration and then the obtained thick CT images are fed into the generator to synthesize thin CT images.

4. The thin cut generation computer framework according to claim 1 wherein the multiple continuous synthetic thin-cut images are five continuous thin-cut images.

5. The thin cut generation computer framework according to claim 1 wherein the generator includes a first stage composed of three convolutional layers adapted to learn high-level semantic features, a second stage composed of nine continuous residual blocks adapted to learn discriminative features, and a third stage composed of three deconvolutional layers responsible for recovering fine details.

6. The thin cut generation computer framework according to claim 1 further including a feature extractor module that enforces characteristics on the synthetic thin CT images that are as close as possible to those of real thin CT in order to mitigate undesirable blurring generation by quantifying divergence of high-level semantic information between real thick-cut cross-sectional images and synthetic thick-cut images derived from synthetic thin-cut cross-sectional images.

* * * * *